United States Patent [19]

Latorre et al.

[11] Patent Number: 5,351,032

[45] Date of Patent: Sep. 27, 1994

[54] POWER LINE DETECTION SYSTEM

[75] Inventors: Victor R. Latorre; Donald B. Watwood, both of Tracy, Calif.

[73] Assignee: Regents of the University of California, Oakland, Calif.

[21] Appl. No.: 19,696

[22] Filed: Feb. 19, 1993

[51] Int. Cl.$^5$ .......................................... H04M 11/04
[52] U.S. Cl. ........................ 340/310 R; 340/310 A; 340/870.31; 340/538
[58] Field of Search .......... 340/310 R, 310 A, 870.31, 340/870.07, 538, 657; 324/127, 133; 364/483, 492

[56] References Cited

U.S. PATENT DOCUMENTS

| 4,006,472 | 2/1977 | Grane | 340/870.09 |
| 4,042,933 | 8/1977 | Lapp | 343/761 |
| 4,355,294 | 10/1982 | Ben-David et al. | 340/870.09 |
| 4,572,662 | 2/1986 | Silverman | 356/5 |
| 4,709,339 | 11/1987 | Fernandes | 340/310 R |
| 4,737,788 | 4/1988 | Kennedy | 342/29 |
| 4,758,962 | 7/1988 | Fernandes | 364/483 |
| 4,818,990 | 4/1989 | Fernandes | 340/870.07 |
| 4,847,595 | 7/1989 | Okamoto | 340/541 |
| 4,902,126 | 2/1990 | Koechner | 356/5 |
| 4,904,996 | 2/1990 | Fernandes | 340/870.07 |
| 5,086,290 | 2/1992 | Murray et al. | 340/539 |
| 5,115,224 | 5/1992 | Kostusiak et al. | 340/574 |
| 5,210,586 | 5/1993 | Grage et al. | 356/5 |

Primary Examiner—John K. Peng
Assistant Examiner—Nina Tong
Attorney, Agent, or Firm—Henry P. Sartorio

[57] ABSTRACT

A short-range, radio frequency (RF) transmitting-receiving system that provides both visual and audio warnings to the pilot of a helicopter or light aircraft of an up-coming power transmission line complex. Small, milliwatt-level narrowband transmitters, powered by the transmission line itself, are installed on top of selected transmission line support towers or within existing warning balls, and provide a continuous RF signal to approaching aircraft. The on-board receiver can be either a separate unit or a portion of the existing avionics, and can also share an existing antenna with another airborne system. Upon receipt of a warning signal, the receiver will trigger a visual and an audio alarm to alert the pilot to the potential power line hazard.

8 Claims, 3 Drawing Sheets

POWER LINE DETECTION SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a power line detection system for air borne vehicles such as helicopters and light aircraft. More specifically, it relates to a short-range, radio frequency transmitting-receiving system that provides both visual and audio warnings to the pilot of a helicopter or light aircraft of an up-coming power transmission line complex.

2. Description of Related Art

The major cause of helicopter fatalities in the United States is a "wire strike". This is defined as a helicopter flying into a suspended power transmission line and subsequently crashing. To date, the most common technique used to warn lowflying aircraft of this danger is a visual one; colored balls are placed on the transmission lines themselves. Strobe lights are sometime used. These method are ineffective in poor weather.

Power transmission lines and overhead cables and wires, which represent the smallest obstacles, are not detectable by conventional microwave radar owing to their small size, and the specular nature of the return signal at the microwave frequencies. Thermal imaging systems are also inadequate since wires are often at the same temperature as the background or are below the resolution limit of these systems. Accident statistics indicate that the high damage incidents and hence high cost are attributable to collisions with power cables since these are the strongest of all cables. See U.S. Pat. No. 4,902,126.

One approach, using radar to detect obstacles in the flight plane, is to discriminate against terrain echos on the basis of vertical antenna directivity, whereby echos from obstacles outside the flight plane are attenuated compared to those close to the flight plane. Unfortunately, directivity in simple radar systems requires large antenna apertures, which are heavy and not compatible with the aerodynamics of airborne vehicles. However, it is well known that a large synthetic aperture can be generated by processing signals received while a relatively small physical antenna is transported through space. This principle is exploited in some airborne radars in which special signal processors use the Doppler history of reflections from terrain objects imparted by aircraft motion to enhance the horizontal resolution of the physical antenna. These techniques fail when the airborne vehicle velocity approaches zero.

It would be advantageous if there were an all-weather, continuously-operating system for alerting helicopter and light aircraft pilots that a potential power line hazard exists in their immediate area. The present invention provides such a system.

SUMMARY OF THE INVENTION

It is an object of the present invention to provide a power line detection system for air borne vehicles such as helicopters and light aircraft.

It is another object of the invention to provide a transmission-line warning-ball mounted transmitter for a power line detection system.

It is another object of the invention to provide a transmission-line tower mounted transmitter for a power line detection system.

It is still another object of the invention to provide a receiver/alarm system for helicopters and light aircraft near power lines.

This invention is a short-range, radio frequency (RF) transmitting-receiving system that provides both visual and audio warnings to the pilot of a helicopter or light aircraft of an up-coming power transmission line complex. Small, milliwatt-level narrowband transmitters, powered by the transmission line itself (with a battery back-up), are installed on top of selected transmission line support towers or within transmission line warning balls, and provide a continuous RF signal to approaching aircraft. The on-board receiver can be either a separate unit or a portion of the existing avionics, and can also share an existing antenna with another airborne system. Upon receipt of a warning signal, the receiver will trigger a visual and an audio alarm to alert the pilot to the potential power line hazard.

DETAILED DESCRIPTION OF THE INVENTION

Figure 1:
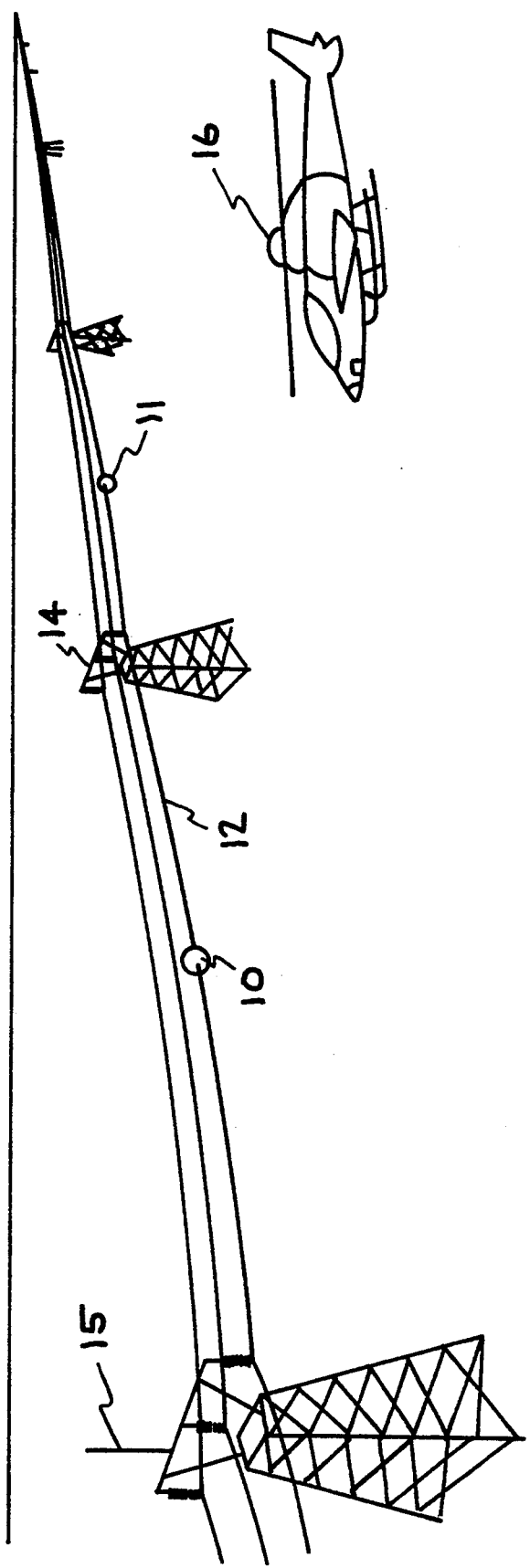
FIG. 1 shows the system diagram of the preferred embodiment.

The present invention is a system that provides a visual and audio warning, to the pilot of a helicopter, light aircraft, or other air borne vehicle, of an up-coming power transmission line structure. The preferred embodiment of the invention, as shown in FIG. 1, comprises a plurality of colored warning balls 10, mounted on an existing power or transmission line 12. Within ball 10 is a commercially available, radio-frequency (RF) transmitter as shown in detail in FIG. 2. Alternatively, the transmitter can be mounted to a transmission tower 14 (FIG. 1). The transmitter provides a continuous RF signal to an approaching aircraft 16.

Figure 2:
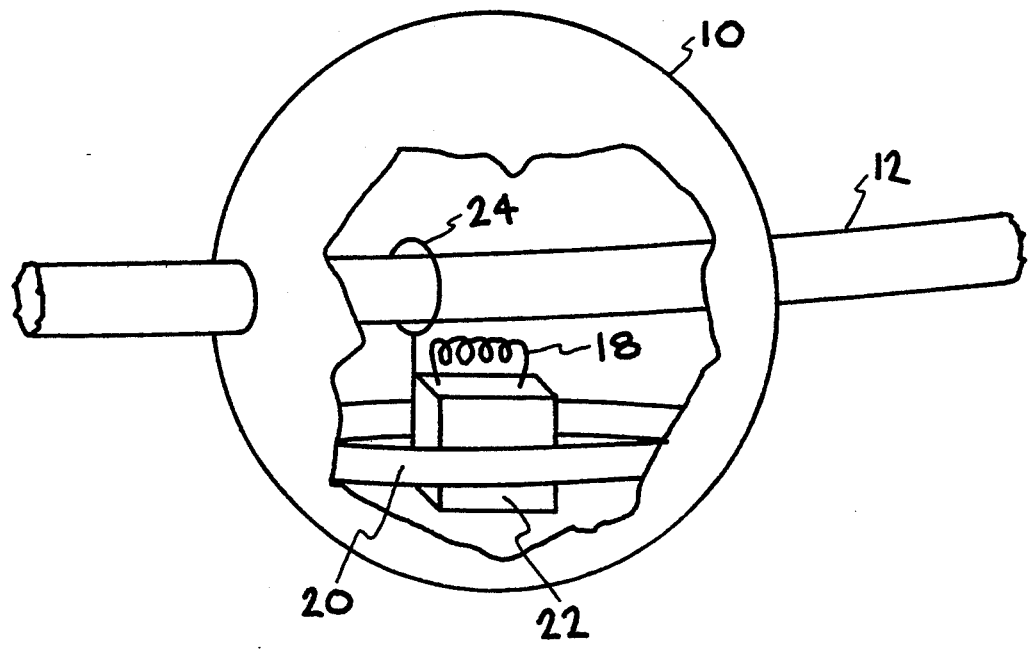
FIG. 2 is diagram of the power line detection system transmitter.

Referring now to FIG. 2, the transmitter package comprises power transducer 18, loop antenna 20, back up battery 22 and common sensor 24, all mounted within warning ball 10 on transmission line 12. Alternatively, the transmitter package can be mounted onto tower 14 in which case a vertical antenna 15 (FIG. 1) would be used instead of loop antenna 20. The transmitter is a line-of-sight (e.g. VHF or UHF) off-the-shelf unit. There are literally hundreds of transmitters and transceivers on the commercial market, ranging from a simple, single channel, hand-held unit (e.g. walkie-talky) costing under $100 per set, up to a digital transmit/receive telemetry unit or communication units costing considerably more.

The transmitter configuration, as shown in FIG. 2, illustrates the ball-mounted unit which draws its primary power from a conductor of transmission line 12. Power transducer 18 comprises an inductor coil with its axis aligned normal to the conductor. The spacing, coil diameter, and number of turns is determined by the actual power required by the transmitter package, as well as the power required by back-up battery 22. Battery 22 must be maintained in a fully charged state for situations in which the power line current is unavailable. Common sensor 24 senses current in power line 12 and switches to back-up battery 22 when the power line current is not provided.

Commercial transmitter packages have a modulator section which is driven by a code generator that can be set to generate the altitude and position information pertinent to the particular obstruction. This altitude and position signal is then amplified and used to drive antenna 20. The effective radiated power required will be less than one watt. Frequency allocations must be obtained from the FCC. Nominally, a range of one mile is desired. For an aircraft velocity of 100 miles per hour, the pilot would have about 36 seconds to take evasive action. This system parameter can be varied depending on the desired warning time and geographic location. Transmitters will be allocated different frequencies than an adjacent RF transmitter 11 (FIG. 1) to eliminate potential interference problems.

Figure 3:
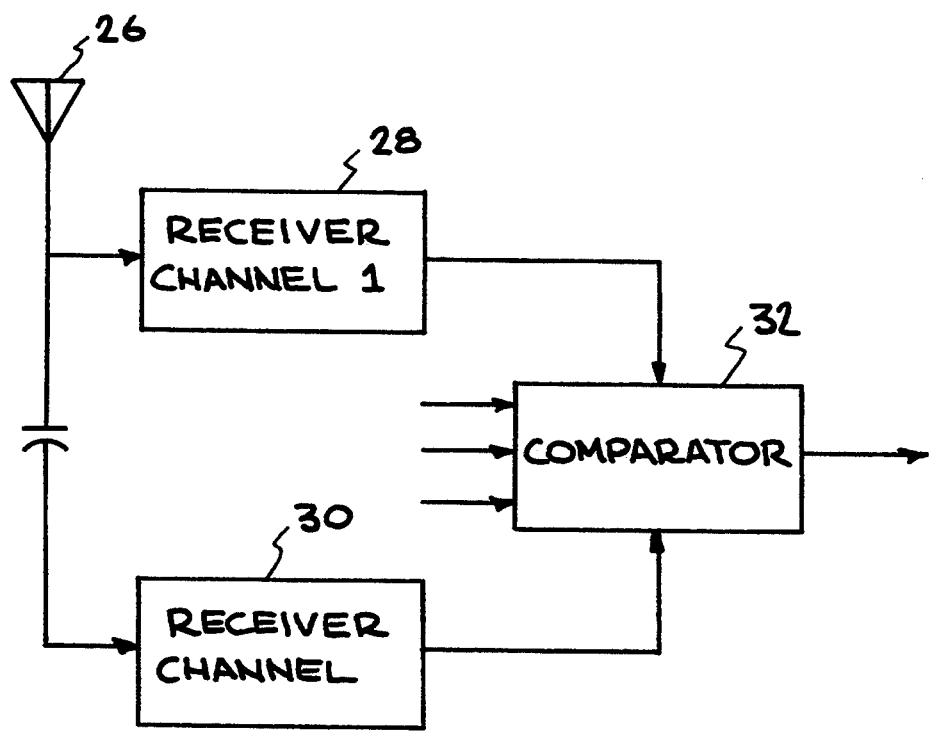
FIG. 3 shows a diagram of the power line detection system receiver.
Figure 4:
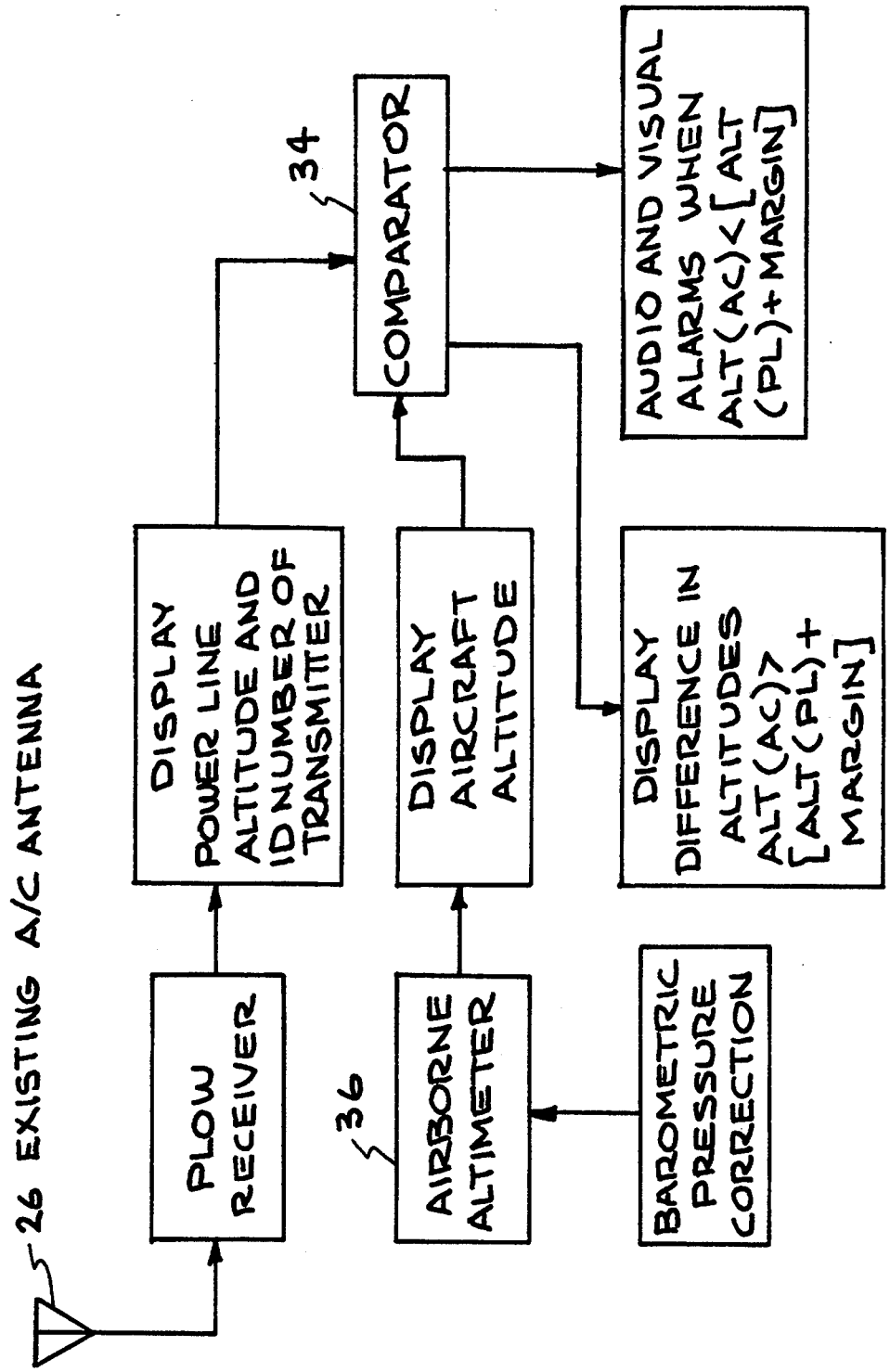
FIG. 4 is a block diagram of the power line detection system logic and displays.

Referring now to FIG. 3, the receiver comprises existing antenna 26 (located on aircraft 16 of FIG. 1), a first receiver channel 28, a second receiver channel 30, and a comparator 32. Antenna 26 receives signals from the transmitter package located within warning ball 10. Antenna 26 feeds this signal into a first receiver channel 28 and second receiver channel 30 which feed signals into comparator 32. The output from comparator 32 is fed into the display and alarm system as shown in FIG. 4. The receiver is a multichannel, off-the-shelf, FM receiver. When an aircraft is in a position to receive more than one transmitter signal, comparator 32 selects the strongest one to send to the display and warning system. The warning transmissions are allocated far enough away in frequency to prevent interference. Other methods such as coding can also be used to prevent interference problems with the warning transmitters.

FIG. 4 shows a block diagram of the display and warning system logic. This incorporates the system shown in FIG. 3. Existing antenna 26 feeds into a first receiver channel 28 and a second receiver channel 30. The output of the receivers is fed into a first comparator 32, which calculates and displays the power line altitude and identification number of the transmitter. This signal is fed into a second comparator 34. The airborne altimeter 36, after barometric pressure correction, is fed into second comparator 34. This unit compares the altitude of the obstruction with the corrected altitude of the aircraft. If the aircraft is high enough, a margin of safety is displayed (amber-lighted display). If the aircraft is too low, audio and visual alarms (e.g. buzzers or flashing red lights) are activated.

Changes and modifications in the specifically described embodiments can be carried out without departing from the scope of the invention which is intended to be limited by the scope of the appended claims.

We claim:

1. A power line detection system for air borne vehicles, said system including at least one transmission line, said system comprising:
    at least one radio-frequency (RF) transmitter mounted on said at least one transmission line;
    a RF receiver located on board an aircraft wherein said receiver is tuned to receive a transmission from said at least one RF transmitter, wherein said RF receiver comprises:
        a RF antenna;
        a first receiver channel to receive a first frequency from said RF antenna;
        a second receiver channel to receive a second frequency from said RF antenna; and
        a first comparator to compare signals from said first receiver channel and said second receiver channel wherein said first comparator sends a signal that is the stronger receiver channel signal of the compare signals to a display and alarm system:
    the display and alarm system located on-board the aircraft, said display and alarm system receiving the stronger receiver channel signal from said first comparator, said display and alarm system comprising:
        a first display to indicate a power line altitude signal and identification number of said at least one transmitter;
        a barometric pressure corrected altimeter producing an aircraft altitude signal;
        a second display to indicate said aircraft altitude signal;
        a second comparator to compare said aircraft altitude signal with said power line altitude signal;
        a third display to indicate the difference between said aircraft altitude signal and said power line altitude signal plus a margin of error; and
        an audio and visual alarm that receives signals from said second comparator, wherein said audio and visual alarm is triggered when said aircraft altitude is less than said power line altitude plus said margin of error.

2. The system of claim 1, wherein said RF transmitter is mounted within a warning ball mounted onto said at least one transmission line.

3. The system of claim 2, wherein said RF transmitter comprises:
    a power transducer to derive power from said at least one transmission line;
    a loop antenna powered by said power transducer;
    a common sensor to sense when said at least one transmission line is not powered; and
    a back-up battery to power said at least one RF transmitter when said common sensor senses that said at least one transmission line is not powered.

4. The system of claim 3, wherein said power transducer has spacing, coil diameter, and number of turns that are determined by the actual power used by said at least one RF transmitter.

5. The system of claim 1, wherein said at least one RF transmitter is mounted on at least one of a plurality of towers of a transmission line complex, said at least one RF transmitter having a vertical antenna.

6. The system of claim 1, wherein said at least one RF transmitter transmits the altitude and position information of said at least one transmission line.

7. The system of claim 1, wherein said at least one RF transmitter has a frequency that has been selected to be different from that of an adjacent RF transmitter.

8. In an existing transmission line complex including at least one tower and at least one transmission line, the improvement comprising a detection system, said detection system including:
    at least one radio-frequency (RF) transmitter mounted on said at least one transmission line;

a RF receiver located on board an aircraft wherein said RF receiver is tuned to receive a transmission from said at least one RF transmitter; and wherein said RF receiver comprising:
- a RF antenna;
- a first receiver channel to receive a first frequency from said RF antenna;
- a second receiver channel to receive a second frequency from said RF antenna; and
- a first comparator to compare signals from said first receiver channel and said second receiver channel wherein said first comparator sends a signal to a display and alarm system after comparing the signals from the first and second receiver channels the display and alarm system located on-board said aircraft wherein said display and alarm system is triggered by said RF receiver when said RF receiver receives a transmission from said at least one RF transmitter, said display and alarm system comprising:
- a first display to indicate a Dower line altitude signal and identification number of said at least one RF transmitter;
- a barometric pressure corrected altimeter producing an aircraft altitude signal;
- a second display to indicate said aircraft altitude signal;
- a comparator to compare said aircraft altitude signal with said power line altitude signal;
- a third display to indicate the difference between said aircraft altitude signal and said power line altitude signal plus a margin of error; and
- an audio and visual alarm that receives signals from said comparator, wherein said audio and visual alarm is triggered when said aircraft altitude is less than said power line altitude plus said margin of error.

* * * * *